US009740996B2

(12) United States Patent
Gao (10) Patent No.: US 9,740,996 B2
(45) Date of Patent: Aug. 22, 2017

(54) SENDING RECOMMENDATION INFORMATION ASSOCIATED WITH A BUSINESS OBJECT (71) Applicant: Alibaba Group Holding Limited, George Town (KY)

(72) Inventor: Jie Gao, Hangzhou (CN)

(73) Assignee: Alibaba Group Holding Limited (KY)

( * ) Notice: Subject to any disclaimer, the term of this patent is extended or adjusted under 35 U.S.C. 154(b) by 153 days.

(21) Appl. No.: 13/850,820

(22) Filed: Mar. 26, 2013

(65) Prior Publication Data

US 2013/0262165 A1 Oct. 3, 2013

(30) Foreign Application Priority Data

Mar. 27, 2012 (CN) .......................... 2012 1 0084708

(51) Int. Cl.
G06F 7/00 (2006.01)
G06F 17/30 (2006.01)
G06Q 10/06 (2012.01)
G06Q 30/02 (2012.01)
G06Q 30/06 (2012.01)

(52) U.S. Cl.
CPC ..... G06Q 10/063 (2013.01); G06F 17/30864 (2013.01); G06Q 30/0253 (2013.01); G06Q 30/0631 (2013.01)

(58) Field of Classification Search
CPC .............................................. G06F 17/30864
USPC ......................................................... 707/721
See application file for complete search history.

(56) References Cited

U.S. PATENT DOCUMENTS

| 7,127,416 | B1 | 10/2006 | Tenorio |
| 7,412,442 | B1 | 8/2008 | Vadon et al. |
| 8,380,698 | B2 | 2/2013 | Sundaranatha |
| 8,688,535 | B2 | 4/2014 | Yuan |
| 2002/0062258 | A1 | 5/2002 | Bailey et al. |
| 2002/0078025 | A1 | 6/2002 | Tanaka |
| 2003/0009392 | A1 | 1/2003 | Perkowski |
| 2004/0088221 | A1 | 5/2004 | Katz et al. |
| 2006/0004850 | A1 | 1/2006 | Chowdhury |

(Continued)

FOREIGN PATENT DOCUMENTS

| CN | 102043781 | 5/2011 |
| JP | 2004013231 | 1/2004 |

(Continued)

OTHER PUBLICATIONS

Takyuya et al., "Capturing Product Knowledge from Web Pages", Word Engineering Research Association Materials, Japan Association for Artificial Intelligence, Mar. 2006.

Primary Examiner — Sujay Koneru
(74) Attorney, Agent, or Firm — Van Pelt, Yi & James LLP (57) ABSTRACT Sending recommendation information associated with a business object is disclosed, including: receiving from a user terminal a request for data associated with a business object; determining a count of requests for the data associated with the business object from the user terminal based at least in part on the request; and determining whether the count of requests meets a request threshold value associated with the business object, wherein in the event that the count of requests meets the request threshold value, sending the requested data and a set of recommendation information associated with the business object to the user terminal.

18 Claims, 8 Drawing Sheets

(56) References Cited

U.S. PATENT DOCUMENTS

| | | |
|---|---|---|
| 2006/0026147 A1 | 2/2006 | Cone et al. |
| 2006/0059225 A1 | 3/2006 | Stonehocker et al. |
| 2006/0224406 A1 | 10/2006 | Leon et al. |
| 2006/0277103 A1 | 12/2006 | Fujita et al. |
| 2007/0022021 A1 | 1/2007 | Walker et al. |
| 2007/0038615 A1 | 2/2007 | Vadon et al. |
| 2007/0043651 A1 | 2/2007 | Xiao et al. |
| 2007/0078832 A1* | 4/2007 | Ott et al. ............... 707/3 |
| 2007/0100650 A1 | 5/2007 | Ramer et al. |
| 2007/0276829 A1 | 11/2007 | Wang et al. |
| 2007/0288602 A1* | 12/2007 | Sundaresan ............ 709/219 |
| 2008/0033939 A1 | 2/2008 | Khandelwal |
| 2008/0183710 A1 | 7/2008 | Serjeantson |
| 2009/0089148 A1 | 4/2009 | Gujjar et al. |
| 2009/0106108 A1 | 4/2009 | Ku |
| 2009/0119261 A1 | 5/2009 | Ismalon |
| 2010/0094733 A1 | 4/2010 | Shapira et al. |
| 2010/0106618 A1 | 4/2010 | Su |
| 2010/0161600 A1* | 6/2010 | Higgins et al. ......... 707/736 |
| 2010/0228629 A1 | 9/2010 | Harrison et al. |
| 2011/0099085 A1* | 4/2011 | Hamilton et al. ....... 705/26.41 |
| 2011/0179081 A1 | 7/2011 | Ovsjanikov et al. |
| 2011/0246300 A1 | 10/2011 | Yarvis et al. |
| 2011/0288956 A1 | 11/2011 | Yuan |
| 2012/0005227 A1* | 1/2012 | Nagano et al. ......... 707/769 |
| 2012/0059735 A1 | 3/2012 | Su et al. |
| 2012/0095975 A1 | 4/2012 | Billingsley et al. |
| 2012/0143840 A1 | 6/2012 | Vadon et al. |
| 2012/0297308 A1* | 11/2012 | Anikul et al. .......... 715/738 |
| 2013/0006735 A1 | 1/2013 | Koenigsberg et al. |
| 2013/0159298 A1* | 6/2013 | Mason et al. .......... 707/728 |
| 2014/0108369 A1* | 4/2014 | Nijjer .................... 707/706 |
| 2014/0280946 A1* | 9/2014 | Mukherjee et al. ..... 709/226 |

FOREIGN PATENT DOCUMENTS

| | | |
|---|---|---|
| JP | 2004127261 | 4/2004 |
| JP | 2007072730 | 3/2007 |
| JP | 2007249600 | 9/2007 |
| JP | 2008077137 | 4/2008 |
| JP | 2008117351 | 5/2008 |
| JP | 2009043264 | 2/2009 |
| JP | 2010009307 | 1/2010 |
| JP | 2011197802 | 10/2011 |
| WO | 2007051397 | 5/2007 |
| WO | 2008019007 A2 | 2/2008 |

\* cited by examiner

SENDING RECOMMENDATION INFORMATION ASSOCIATED WITH A BUSINESS OBJECT

CROSS REFERENCE TO OTHER APPLICATIONS

This application claims priority to People's Republic of China Patent Application No. 201210084708.0 entitled AN INFORMATION RECOMMENDATION METHOD AND DEVICE, filed Mar. 27, 2012 which is incorporated herein by reference for all purposes.

FIELD OF THE INVENTION

The present application relates to the field of Internet technology. In particular, it relates to techniques for recommending information.

BACKGROUND OF THE INVENTION

With the arrival of the information age, the Internet has come to play an increasingly important role in people's lives. People are able to acquire all kinds of information rapidly and in real-time via the Internet. Internet applications have provided people with great convenience in their lives and in their work. It has thus become a technology with very broad applications today.

Because of its universality, the Internet has become a convenient vehicle for business. Business that is realized via the Internet is generally referred to as Internet business or electronic commerce (e-commerce). There are currently many types of Internet businesses, which are primarily realized through websites that are supported by corresponding web servers. For example, web servers primarily provide various kinds of transaction services to major users through transaction-based websites. Transaction-based websites include physical transaction services, information transaction services, and so on. Transaction-based services on such websites are mainly provided as follows: descriptive information associated with a business object that is sold by a seller user is displayed at a web page and prospective buyer users may view the web page and decide to purchase the business object. For example, a business object may comprise a physical product or a non-physical product (such as a set of information). If the business object is physical, the descriptive information displayed on the web page associated with the business object could be a picture of the physical object and its name, use, price, and other such information. If the business object is non-physical (e.g., a digital file), the descriptive information displayed on the web page could be a summary of, or key fields from, this information. After the seller user of the business object has submitted the descriptive information on the business object to the web server associated with selling the business object, prospective buyer users may visit the web page associated with the business object and make a selection associated with purchasing the business object. For example, in response to a prospective buyer user's selection to purchase the business object, a request is sent to the web server associated with selling the business object, and the web server may complete the user's transaction. Completion of the user's transaction may include requesting that the user perform login to the website associated with selling the business object and/or requesting that the user provide payment information (e.g., credit card information).

Conventionally, when a prospective buyer user decides to purchase a business object that is advertised on a web page, his or her selection is likely based on the attribute information of the business object that is included in the displayed descriptive information associated with the business object. For example, the prospective buyer may base his or her decision to purchase or not purchase the business object on the name, use, pictures, and other attribute information that are included in the descriptive information of the business object displayed on the web page. However, there are some disadvantages to having prospective buyer users make decisions whether to purchase or not purchase a business object based primarily on the attribute information displayed for the business object, such as the following:

First, there is a great volume and variety of business objects being sold at various websites on the Internet. While visiting the web page associated with advertising business objects, prospective buyer users may experience uncertainty about whether or not to purchase any particular business object. While a user remains undecided about whether to purchase a business object, the user may hold off on purchasing the business object but repeatedly visit the same web pages at which the business object is sold. However, such web pages may feature a static set of attribute information associated with the business object that was submitted by the seller user when the business object first became available at the website. As such, no matter how many times the user checks back at the web page associated with the business object, the user is unlikely to be persuaded to purchase the business object based on repeatedly reviewing the same, static set of attribute information.

Second, various different websites may sell the same business object (e.g., each website could display the same business object and with similar attribute information), which could cause prospective buyer users to spend time comparing the attribute information displayed at the different websites for the same business object. For example, a user who is undecided about purchasing a business object may end up visiting several different websites that sell the business object. However, because each website may offer similar attribute information for the business object, the user is unlikely to be persuaded to purchase the business object from any particular website. Therefore, the user may not proceed with buying the business object through any website.

Both of the problems described above involve a user repeatedly visiting the same or different web page that advertises a business object that the user is undecided about purchasing. However, each time the user visits a web page associated with a business object, the data associated with the web page must be requested, which will consume a certain amount of network resources (e.g., for the requesting client device, the web server associated with servicing the requests, and/or any networks in between the client device and the web server). Therefore, the more times a user visits a web page associated with a certain business object, the greater the amount of network transmission resources that will be occupied. The increase in occupied network resources becomes even more obvious as the number of users conducting multiple visits to the business objects increases (e.g., because a lag may be experienced in between requests for web page data).

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embodiments of sending recommendation information associated with a business object are described herein. In various embodiments, a server maintains records associated with a number of times a request for data associated with a business object is received from a user terminal. In various embodiments, none of the counted requests result in a purchase/transaction associated with the business object. If it is determined that a received request for data associated with a business object received from a user terminal meets or exceeds a request threshold value associated with that business object, then in addition to the requested data associated with the business object, the server also sends a set of recommendation information associated with the business object to the user terminal. In some embodiments, the set of recommendation information was submitted by a seller user that is offering to sell the business object. The set of recommendation information is intended to encourage the prospective buyer user using the user terminal to complete a purchase of the business object whose descriptive information the user has apparently been repeatedly requesting but without yet completing a purchase of. For example, the set of recommendation information may include a promotional price associated with the business object (e.g., if the prospective buyer user agrees to go through with purchasing the business object), a sales pitch that highlights benefits of the business object, testimonials associated with other users who have previously purchased the business object, and/or additional information about the business object. In some embodiments, the request threshold value at which the set of recommendation information is sent may be determined based on historical request data associated with the business object. In some embodiments, the request threshold value at which the set of recommendation information is sent may be user configured.

Embodiments of sending recommendation information are described below in light of the specification figures. It needs to be understood that the embodiments described herein serve merely to describe and explain the techniques and not to limit the present application. Moreover, the embodiments described herein and the features in the embodiments can be combined with each other so long as they do not conflict.

Figure 1:
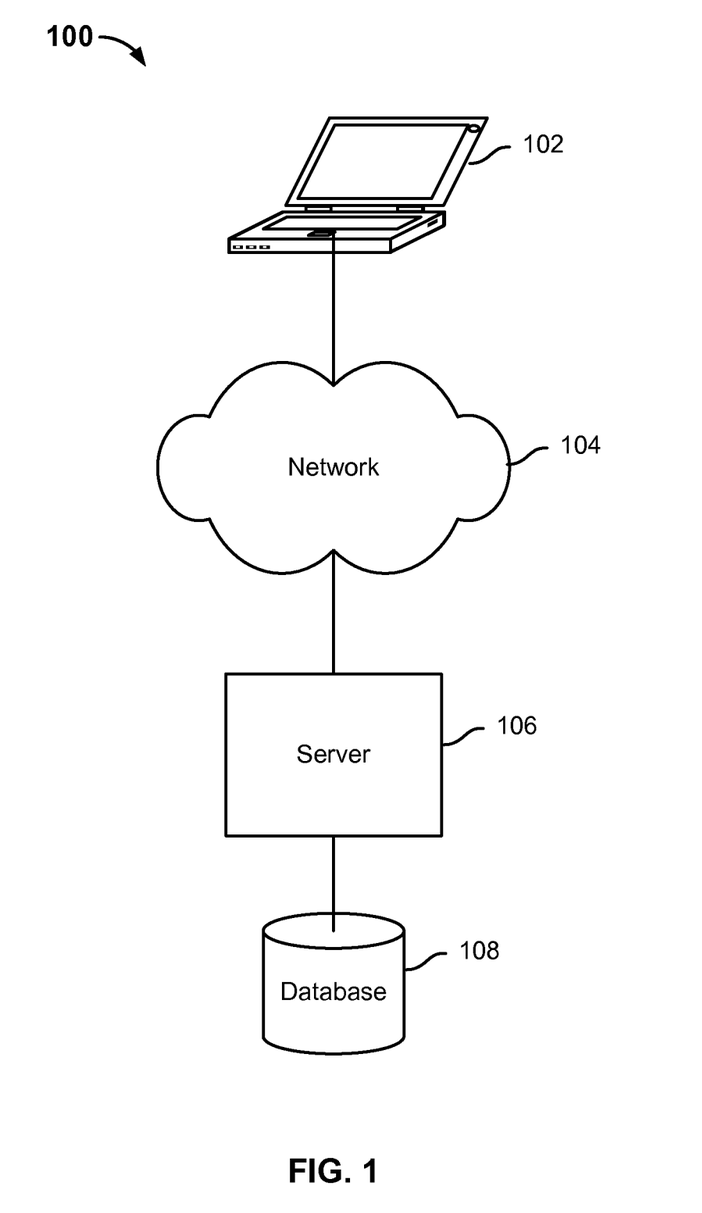
FIG. 1 is a diagram showing an embodiment of a system for sending recommendation information associated with a business object.

FIG. 1 is a diagram showing an embodiment of a system for sending recommendation information associated with a business object. In the example, system 100 includes user terminal 102, network 104, server 106, and database 108. Network 104 includes high speed data networks and/or telecommunications networks. User terminal 102 communicates to server 106 over network 104.

In some embodiments, server 106 is associated with a web server associated with an e-commerce website. Business objects are sold over the website and a set of descriptive information (e.g., attribute information associated with the business object, images of the business object, price of the business object) is stored for each business object at database 108. A web page of the website may display the set of descriptive information associated with each business object and include a control associated with purchasing the business object. A set of recommendation information associated with each business object is also stored at database 108. In some embodiments, the set of recommendation information is received by the same seller user that is associated with having submitted the set of descriptive information associated with the business object.

A prospective buyer user may be browsing the website (e.g., with a web browser application) using user terminal 102. While user terminal 102 is shown to be a laptop in the example, other examples of user terminals may be a desktop computer, a tablet device, a mobile device, a smart phone, or any other computing device. Each time the prospective buyer user visits a web page associated with a particular business object, user terminal 102 sends a request for the data associated with the business object to be displayed at that web page from server 106. In response to receiving the request, server 106 updates request count information associated with the total number of received requests corresponding to the user terminal from which the request was received and the business object for which data is requested.

In some embodiments, the request count information is maintained by server 106 at database 108. If server 106 determines that the updated request count including the received request associated with user terminal 102 and the business object meets a request threshold value associated with the business object, then in addition to sending the requested data associated with the business object to user terminal 102, server 106 also sends a set of recommendation information (e.g., stored at database 108) associated with the business object to user terminal 102. The requested data and the set of recommendation information associated with the business object is displayed at user terminal 102, where the set of recommendation information may include information that intends to persuade the user using user terminal 102 to follow through with purchasing the business object. In some embodiments, whether the prospective buyer user associated with a user terminal does purchase or does not purchase a business object after each subsequent request is stored at database 108 as historical request data and may be used to determine the request threshold value for the business object.

Figure 2:
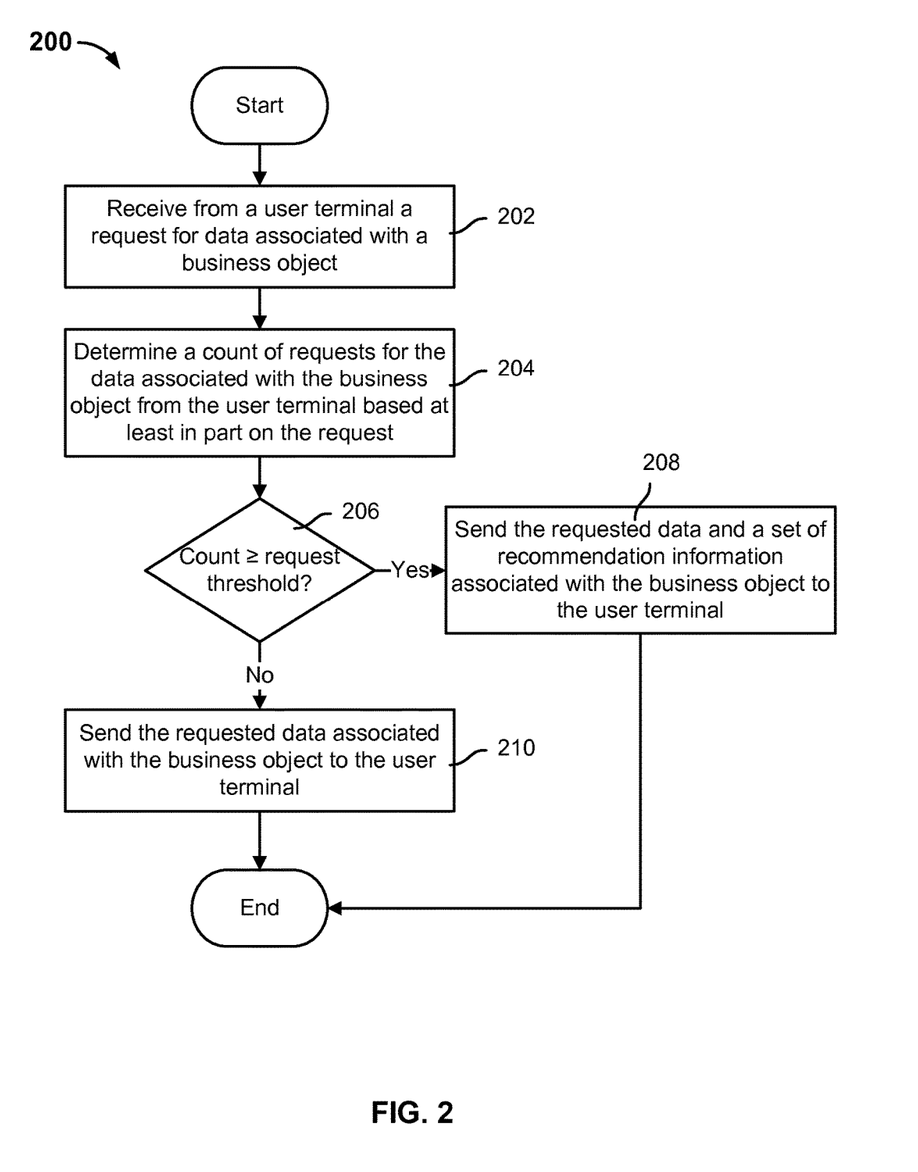
FIG. 2 is a flow diagram showing an embodiment of a system for sending recommendation information associated with a business object.

FIG. 2 is a flow diagram showing an embodiment of a system for sending recommendation information associated with a business object. In some embodiments, process 200 is implemented at system 100 of FIG. 1. In particular, in some embodiments, process 200 is implemented at server 106 of system 100 of FIG. 1.

Process 200 may be used to determine when it is appropriate to send a set of recommendation information to a user terminal with respect to a business object for which data (e.g., descriptive information associated with the business object) has been repeatedly requested by the user terminal. It is assumed that the data associated with the business object is repeatedly requested by the user terminal because a prospective buyer user at the user terminal has not yet decided whether or not to purchase the business object. In process 200, it is determined that it is appropriate to send the set of recommendation information associated with a business object to the user terminal when a total number of requests received from that user terminal with respect to that business object meets a request threshold value configured for that business object. While the prospective buyer user may eventually purchase the business object on his or her own (without receiving a set of recommendation information) after making one or more subsequent requests for the data associated with the business object, one advantage of sending the set of recommendation information once the request threshold is met is to encourage and/or incentivize the user to complete the purchase of the business object sooner than when the user would have otherwise made the purchase, if ever. By encouraging the user to complete the purchase, the user may actually follow through with the transaction, thereby saving the user from performing further repetitive requests and saving network resources that would have otherwise been used to request and respond to further requests for the data associated with the business object from the user terminal.

At 202, a request for data associated with a business object is received from a user terminal. For example, while a prospective buyer is browsing web pages at an e-commerce website associated with selling various business objects, the user comes across a web page associated with a particular business object that the user is considering to purchase. By virtue of selecting the link associated with the web page associated with the business object, the user terminal used by the prospective buyer user sends a request for data associated the business object. For example, the requested data may comprise data that is to be displayed at the web page associated with the business object. The data to be displayed at the web page associated with the business object may include descriptive information such as, for example, an identifier, an image, attribute information, and/or user feedback associated with the business object. In some embodiments, a request for data associated with a business object may include, for example, an identifier associated with the user terminal (e.g., a MAC address, IP address, or the registered login name of the user using the user terminal) and an identifier associated with the business object. Assume for example, that a user terminal identified by the identifier of ABC has sent a request for data associated with the business object 123.

At 204, a count of requests for the data associated with the business object from the user terminal is determined based at least in part on the received request. A total count of requests received from a specific user terminal to a specific business object is maintained by the server. In some embodiments, a count is maintained for each unique combination of a user terminal and a business object. For example, a request record can be created for each request. The request record may include the user terminal identifier included in the request and also the business object identifier included in the request. Then, based on the request record, the total count associated with the combination of the user terminal identified in the request record and the businesses object identified in the request record is incremented by one.

In response to receiving the request at step 202, the total count associated with the user terminal's requests for data associated with the business object is incremented by one. Below is one example technique of how the server maintains counts of requests received from user terminals for data associated with various business objects:

The server maintains total counts associated with the number of requests different user terminals have sent for data for various business objects. The server may organize the maintained total counts in any manner appropriate. In order to reduce the amount of storage space that is taken up, in the server's maintained request count information, business objects may be given identifiers (e.g., according to their respective attribute keywords or according to the categories assigned to the business objects based on a categorization system maintained by the server). User terminals can also be assigned identifiers (e.g., according to the user terminal's IP (Internet Protocol) address or the registered login name of the users or other such information that can be used to uniquely identify each user terminal).

Table 1, below, shows an example of an example table that a server may use to organize the maintained request count information associated with various combinations of business objects and user terminals:

TABLE 1

| Business Object Identifiers | User Terminal Identifiers | Total Request Counts |
|---|---|---|
| Business object 1 | User terminal 11 | 3 |
| | User terminal 12 | 4 |
| | . . . | . . . |
| | User terminal 1m | 1 |
| Business object 2 | User terminal 21 | 3 |
| | User terminal 22 | 5 |
| | . . . | . . . |
| | User terminal 2m | 2 |
| . . . | . . . | . . . |
| Business object n | User terminal n1 | 6 |
| | User terminal n2 | 3 |
| | . . . | . . . |
| | User terminal nm | 5 |

In the example table of Table 1, identifiers associated with business objects are stored in the left-most column, identifiers associated with user terminals are stored in the middle column, and the total number of request counts corresponding to each user terminal for data associated with the business object are stored in the right-most column. In the example of Table 1, a row of count information is stored for each business object associated with identifiers of 1 through n, where n is an integer. Each row, which is associated with one business object, includes several sub-rows in the middle and right-most columns, where each sub-row corresponds to a particular user terminal associated with identifiers of 1 through m, where m is an integer, and the number of requests that have been received from that user terminal for the data associated with the business object identified by the business object identifier of that row. For example, the total count of requests for data associated with Business object 2 received from User terminal 22 is 5. Because the same user terminal may visit multiple business objects, the server may keep separate request counts sent from the user terminal with respect to different business objects.

The maintained request count information organized in the form of Table 1 above is merely an example. Request counts maintained by the server may be organized in any other appropriate manner.

In some embodiments, the maintained request count information described above may be stored in the local storage of a server. If the data volume of the request count information exceeds a preset data volume, then the request count information may also be stored in a separate database server so as to prevent the request count information from taking up too much server storage resources and thus diminishing server performance. In some embodiments, the request count information with respect to user terminals may be reset over time. For example, a time interval may be set such that at the completion of each such interval, the request count information maintained for one or more user terminals may be deleted so that request counts for each of the one or more user terminals may subsequently start from zero.

Request count information maintained by the server is updated each time a request for data associated with a business object is received. So, at step 204, maintained request count information, such as a table such as Table 1, can be updated. For example, if at step 204, a request is received from User terminal 11 for data associated with Business object 1, then in Table 1, the total request count between Business object 1 and User terminal 11 may be updated to be (3+1=)4. However, if it is determined that an entry associated with the combination of the user terminal identified in a received request and the business object identified in the request has not yet been established at the server's maintained request count information, then a new entry can be added for the combination. For example, if a request received from User terminal (n+1)1 is for data associated with Business object n+1, then a new row corresponding to Business object n+1 can be created and the total request count between Business object n+1 and User terminal (n+1)1 can be set as 1.

At 206, it is determined whether the count of requests for the data associated with the business object from the user terminal meets or exceeds a request threshold value. In the event that the request threshold value is met, then control passes to 208. Otherwise, in the event that the request threshold value is not met, control passes to 210.

In various embodiments, a request threshold value is used to determine when it is appropriate to send a set of recommendation information associated with a business object. In some embodiments, each business object is associated with the same request threshold value. In some embodiments, a request threshold value is configured (e.g., by a user or automatically determined) specific to each business object. Examples of configuring the request threshold value specific to each business object is described further below. A business object's request threshold value may be updated over time.

When the server determines that the total count of requests for the data associated with the business object from the user terminal meets or exceeds the request threshold value associated with the business object, then the server is triggered to send a set of recommendation information stored for the business object. In some embodiments, the set of recommendation information stored for the business object is submitted to the server by the same seller user that is associated with submitting the descriptive information associated with the business object. In some embodiments, the set of recommendation information is submitted by a system administrator user associated with the e-commerce website at which the business object is offered for sale. In a first example, the set of recommendation information stored for the business object may include a promotional price associated with the business object such that if the business object is purchased within a certain time from receiving the set of recommendation information stored for the business object, the business object may be purchased at the promotional price (which is most likely lower than the original price). In a second example, the set of recommendation information stored for the business object may include a sales pitch that describes the best attributes of the business object. In a third example, the set of recommendation information stored for the business object may include details (e.g., additional user feedback, additional images, additional attribute information) regarding the business object that is not included in the static set of descriptive information that is normally displayed for the business object at the web page of the business object.

At 208, the data associated with the business object and a set of recommendation information associated with the business object are sent to the user terminal. In the event that the request threshold value associated with the business object is met, then the set of recommendation information associated with the business object is sent with the requested data to the user terminal. In some embodiments, the requested data comprises the descriptive information associated with the business object and can be displayed at the web page associated with the business object by a web browser application at the user terminal. In some embodiments, the user terminal can display the set of recommendation information associated with the business object in a manner different than the manner in which the requested data is displayed at the web page associated with the business object. For example, the set of recommendation information associated with the business object may be displayed as an overlay (e.g., via an iframe) on top of the web page so as to catch the prospective buyer user's attention as he or she is preparing to view the requested data. The set of recommendation information associated with the business object is used to steer a user who has a history of viewing the web page associated with the business object but not purchasing the business object into committing to finally purchasing or not purchasing the business object so that the user will likely not continue to view the web page associated with the business object.

At 210, the data associated with the business object is sent to the user terminal. In the event that the request threshold value associated with the business object is not met, then the set of recommendation information associated with the business object is not sent with the requested data to the user terminal.

Figure 3:
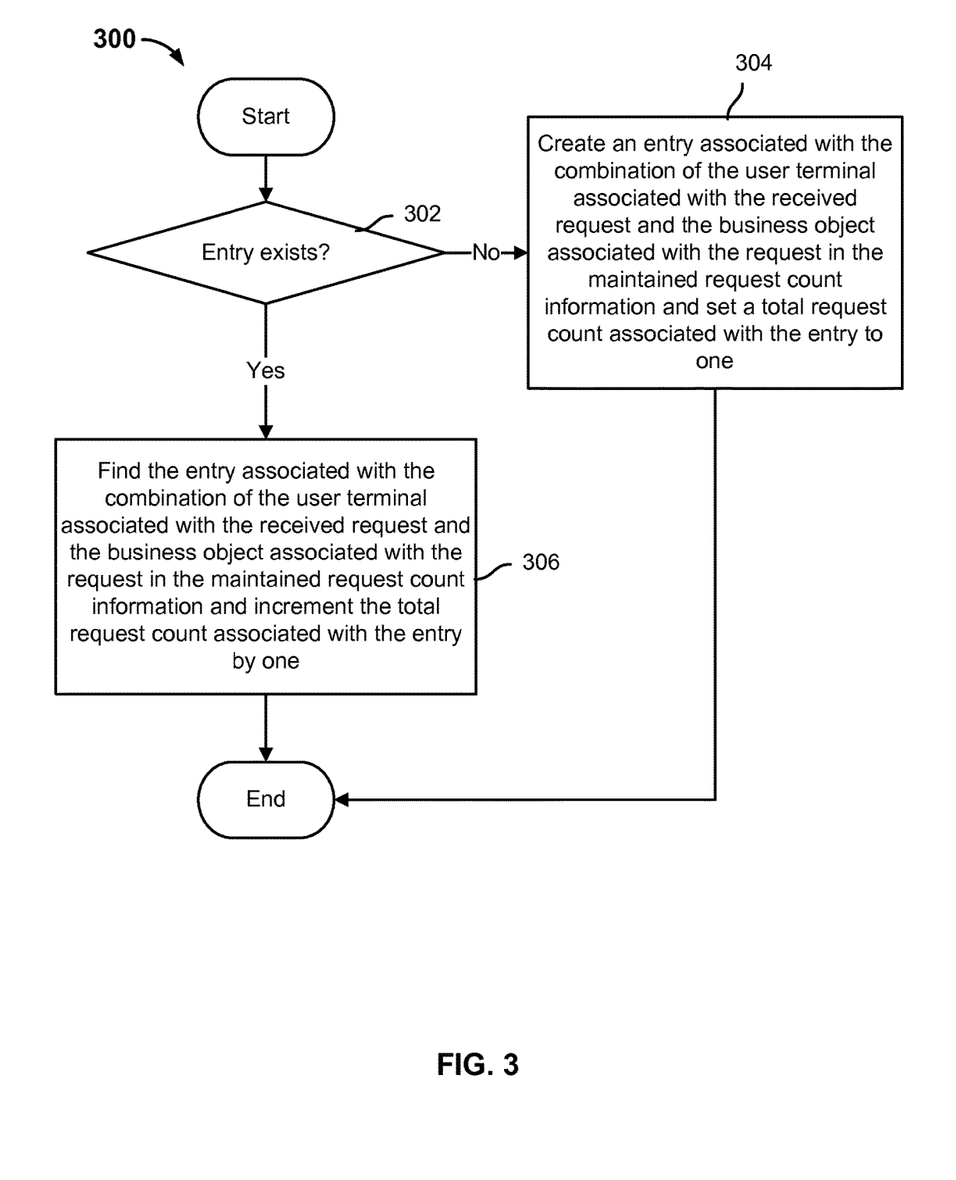
FIG. 3 is a flow diagram showing an embodiment of a process for updating the request count information maintained by the server.

FIG. 3 is a flow diagram showing an embodiment of a process for updating the request count information maintained by the server. In some embodiments, process 300 is implemented at system 100 of FIG. 1. In particular, in some embodiments, process 300 is implemented at server 106 of system 100 of FIG. 1.

Process 300 may be used by a server to keep track of the counts of requests for data associated with different business objects that it receives from different user terminals. The server can use the maintained request count information in determining when to send a set of recommendation information in response to a received request, such as in process 200 of FIG. 2.

At 302, it is determined whether an entry in maintained request count information associated with a combination of a user terminal associated with a received request and the business object associated with the request exists. In the event that the entry is not found to exist, then control passes to 304. Otherwise, in the event that the entry is found to exist, then control passes to 306. For a request for data associated with a business object that is received at the server from a user terminal, it is determined whether an entry associated with the business object and the user terminal identified by the respective business object identifier has already been created in the request count information maintained by the server. If no such entry exists, then it is possible that no request associated with the combination of that business object and that user terminal has been previously received at the server. Or that an entry previously existed but has been recently discarded when the maintained request count information was reset.

At 304, the entry associated with the combination of the user terminal associated with the received request and the business object associated with the request is created in the maintained request count information and a total request count associated with the entry is set to one. If the entry did not previously exist, then the entry is created and the total count associated with the number of received requests for data associated with the business object from the user terminal is set to one. Creating a new entry and setting the total request count to one indicates that the first of such requests has been received at the server.

At 306, the entry associated with the combination of the user terminal associated with the received request and the business object associated with the request is found within the maintained request count information and the total request count associated with the entry is incremented by one. Incrementing the total request count of the found entry indicates that another of such requests has been received at the server.

Figure 4:
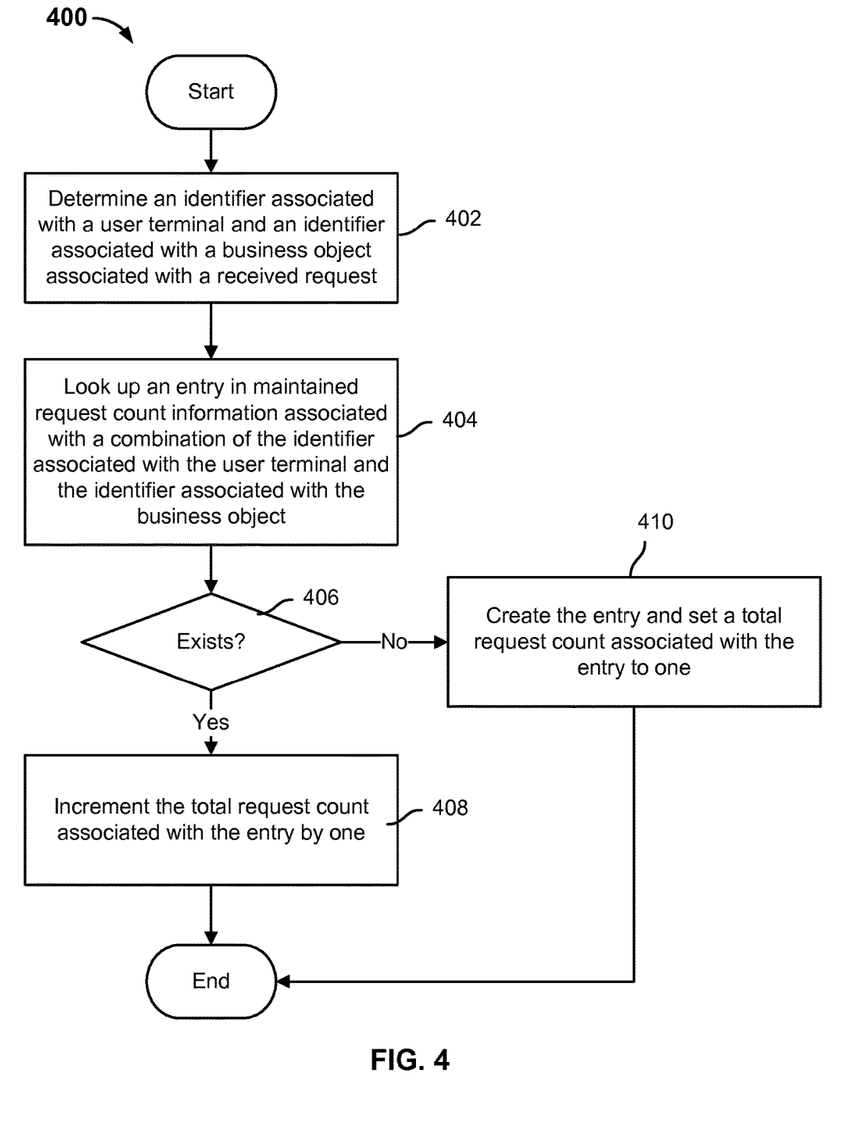
FIG. 4 is a flow diagram showing an embodiment of a process for updating the request count information maintained by the server.

FIG. 4 is a flow diagram showing an embodiment of a process for updating the request count information maintained by the server. In some embodiments, process 400 is implemented at system 100 of FIG. 1. In particular, in some embodiments, process 400 is implemented at server 106 of system 100 of FIG. 1

Process 400 is similar to process 300 and may also be used by a server to keep track of the counts of requests for data associated with different business objects that it receives from different user terminals. The server can use the maintained request count information in determining when to send a set of recommendation information in response to a received request, such as in process 200 of FIG. 2.

At 402, an identifier associated with a user terminal and an identifier associated with a business object associated with a received request are determined. In some embodiments, the identifier associated with a user terminal and the identifier associated with a business object associated with a request are determined based on the user terminal identifier and the business object identifier that are included in the request. In some embodiments, the identifier associated with a user terminal and the identifier associated with a business object associated with a request are determined based on a temporary cookie file that is associated with the user terminal that sent the request.

At 404, an entry in the maintained request count information associated with a combination of the identifier associated with the user terminal and the identifier associated with the business object is looked up. The entry is looked up at the request count information maintained by the server.

At 406, it is determined whether the entry can be found within the maintained request count information. If the entry can be found, then the entry exists and control passes to 408. Otherwise, if the entry cannot be found, then the entry does not currently exist and control passes to 410.

At 408, the total request count associated with the entry is incremented by one.

At 410, the entry is created and a total request count associated with the entry is set to one.

Below are examples of applying process 200 and either process 300 or process 400 to determine whether to send a set of recommendation information associated with a business object to a user terminal associated with sending a request for data associated with the business object:

The follow examples refer to the example of maintained request count information as shown in Table 1, above. Assume that a request threshold value set for Business object 1 is 5. Also, assume that a request is received from User terminal 11 for data associated with Business object 1. After the server receives the request sent by User terminal 11 for data associated with Business object 1, the server checks Table 1, finds the appropriate entry in Table 1 that is associated with Business object 1 and User terminal 11, and determines that the current total request count associated with User terminal 11 and Business object 1 is 3. After incrementing the total request count of the entry based on the received request, the server determines that the updated total request count is now 4, which is less than the request threshold value of 5. Therefore, the server determines that the current received request from User terminal 11 for data associated with Business object 1 does not trigger the sending of recommendation information associated with Business object 1 to User terminal 11 with the requested data and subsequently sends just the requested data to User terminal 11.

Sometime later, another request is received from User terminal 11 for data associated with Business object 1. The server checks Table 1, finds the appropriate entry in Table 1 that is associated with Business object 1 and User terminal 11, and determines that the current request total counts associated with User terminal 11 and Business object 1 is 4. After incrementing the total request count of the entry based on the received request, the server determines that the updated total request count is now 5, which meets the request threshold value associated with Business object 1. Therefore, the server determines that the received request from User terminal 11 for data associated with Business object 1 does trigger for the sending of recommendation information associated with Business object 1 to User terminal 11 with the requested data and subsequently sends both the requested data and the set of recommendation information to User terminal 11.

The set recommendation information associated with Business object 1 that the server may send to User terminal 11 may include information pointing out that the acquisition conditions for purchasing Business object 1 have decreased or been made more attractive and/or additional descriptive information highlighting the benefits of Business object 1. Specifically, decreasing the acquisition conditions or making the acquisition conditions attractive for purchasing Business object 1 may, for example, include lowering the price of Business object 1 or removing a requirement that the prospective buyer user must be a member associated with the website at which Business object 1 is available. Examples of descriptive information highlighting the benefits of Business object 1 include positive user feedback for Business object 1 from users who have previously purchased Business object 1.

Embodiments of determining a request threshold value for a business object are described. The request threshold value may be flexibly determined. In some embodiments, the same request threshold value may be configured for all business objects. In some embodiments, a request threshold value may be configured for each specific business object. As described above, a request threshold value associated with a business object refers to the number of requests received for data associated with the business object from a user terminal after which a set of recommendation information associated with the business object is sent with the requested data to the user terminal.

Based on the assumption that there could be a varying number of requests for data associated with different business objects before the user decides whether to purchase the business object or not purchase the business object, below are two embodiments of determining a request threshold value for each individual business object:

Embodiment 1

The seller user that is selling a business object is instructed to submit a desired request threshold value for the business object.

Embodiment 2

The request threshold value associated with each business object is determined based on historical request data associated with the business object.

Embodiments 1 and 2 of configuring the request threshold value for a business object are merely examples. Other techniques for configuring the request threshold value may also be used. No further examples will be provided here.

Figure 5:
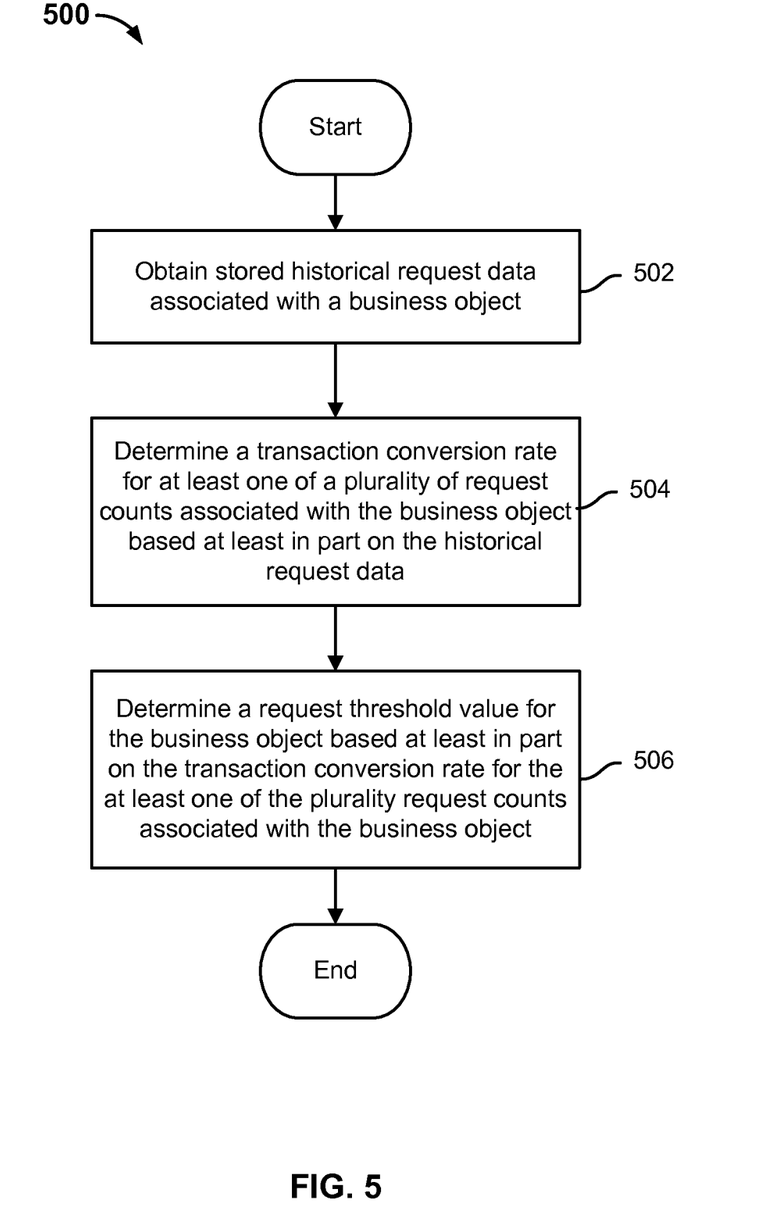
FIG. 5 is a flow diagram showing an embodiment of a process for determining a request threshold value associated with a business object based on the historical request data associated with the business object.

FIG. 5 is a flow diagram showing an embodiment of a process for determining a request threshold value associated with a business object based on the historical request data associated with the business object. In some embodiments, process 500 is performed at system 100 of FIG. 1.

At 502, stored historical request data associated with a business object is obtained. The historical request data associated with a business object includes, for each of various request counts (e.g., 1 request, 2 requests, 3 request, etc.), the historical number of user terminals that have requested data associated with the business object that many times and the historical number of user terminals that have purchased the business object after having requested for the data associated with the business object that many times.

At 504, a transaction conversion rate is determined for at least one of a plurality of request counts associated with the business object based at least in part on the historical request data. A transaction conversion rate associated with each request count associated with the business object is determined based on the historical request data associated with the business object. In various embodiments, the transaction conversion rate associated with the request count i is the ratio of the number of user terminals that have successfully purchased the business object after having requested for the data associated with the business object i times to the total number of user terminals that have requested for the data associated with the business object i times, where i is any integer greater than or equal to 1 and less than or equal to the maximum number of request counts for the business object associated with any user terminal. Specifically, to determine the transaction conversion rates corresponding to different request counts for the business object is to determine the ratio of the number of user terminals who have requested for the data associated with the business object for the $i^{th}$ time and that have successfully purchased the business object after having requested the data for the $i^{th}$ time to the total number of user terminals that have requested for the data associated with the business object for the $i^{th}$ time. For example, assume that the maximum number of requests for data associated with a business object by any user terminal is N, where N is an integer greater than zero. Thus, a transaction conversion rate corresponding to each of N maximum request counts for the business object is individually determined as follows: the transaction conversion rate corresponding to user terminals who have requested for data associated with the business object for the $1^{st}$ time; the transaction conversion rate corresponding to user terminals who have requested for data associated with the business object for the $2^{nd}$ time, . . . , the transaction conversion rate corresponding to user terminals who have requested for data associated with the business object for the $N^{th}$ time.

At 506, a request threshold value is determined for the business object based at least in part on the transaction conversion rate determined for the at least one of the plurality of request counts associated with the business object.

The transaction conversion rate determined for each request count i is used as a basis for setting the request threshold value corresponding to the business object. For example, a particular request count value corresponding to a transaction conversion rate that is less than a preset value may be configured as the request threshold value for the business object.

Below is an example of applying process 500 in determining a request threshold value associated with a business object:

The example of maintained request count information of Table 1 is used in the example, which illustrates determining a request threshold value for Business object 1. Assume that for Business object 1, the fewest number of requests by any user terminal for data associated with Business object 1 is 1 and the maximum of requests by any user terminal for data associated with Business object 1 is 4. Assume that the number of user terminals that have made 1 request for Business object 1 is 1000, and that of these 1000 user terminals, 50 user terminals have successfully purchased Business object 1 after having made the 1 request; that the number of user terminals that have made 2 requests for Business object 1 is 900, and that of these 900 user terminals, 36 user terminals successfully purchased Business object 1 after having made the 2 requests; the number of user terminals that have made 3 requests to Business object 1 is 500, and that of these 500 user terminals, 15 user terminals successfully purchased Business object 1 after having made the 3 requests; and the number of user terminals that have made 4 requests for Business object 1 is 400, and that of these 400 user terminals, 4 user terminals successfully purchased Business object 1 after having made the 4 requests.

On the basis of the request count records described above, one can determine the transaction conversion rates corresponding to user terminals that have made 1, 2, 3 and 4 visits, respectively, to Business object 1 as follows:

User terminals that have made 1 request for data associated with Business object 1: 50/1000=5%

User terminals that have made 2 requests for data associated with Business object 1: 36/900=4%

User terminals that have made 3 requests for data associated with Business object 1: 15/500=3%

User terminals that have made 4 requests for data associated with Business object 1: 4/400=1%

As such, according to the historical request count records, the probability of a user terminal purchasing the business object decreases, i.e., the transaction conversion rate decreases, as the number of user terminal requests for Business object 1 increases. This decreasing trend in transaction conversion rates to increasing request counts in this example may indicate that historically, users are less likely to purchase the business object over multiple requests for data associated with the business object. However, as shown in this example, there is a slight drop-off in the pattern of historical transaction conversion rates—in between $3^{rd}$ and $4^{th}$ requests, the transaction conversion rate drops from 3% to 1%, signifying that after the $3^{rd}$ request, historically, users become much less likely to purchase the business object. In order to attain the objective of conserving network resources and server processing resources, a request threshold value may be configured for Business object 1 as a value corresponding to a highest request count associated with a transaction conversion rate that is less than a preset value. One rationale for setting the request threshold as such is to enable the set of recommendation information to be sent to the prospective buyer user just before a request count associated with a historical drop-off in the conversion rate for that business object occurs. By sending out the set of recommendation information in response to this particular instance of the request could encourage the user to potentially purchase the business object before the user is likely to lose interest in the business object. For example, assume that the preset transaction conversion rate value is configured to be 4%. The transaction conversion rate of a user terminal when it has made 3 requests for Business object 1 is, according to the data above, 3%, which is less than 4%. Therefore, the request threshold value for Business object 1 can be set to 3. Thus, when the user terminal makes its $3^{rd}$ request to Business object 1, the server will provide the set of recommendation information associated with Business object 1 to the user terminal associated with the request. After user terminals have requested for data associated with Business object 1 for the $3^{rd}$ time, due to the sent set of recommendation information, the number of user terminals that purchase the business object after having requested for the data associated with Business object 1 for the $3^{rd}$ time may rise relative to the historical request count records above, and each subsequent request count's transaction conversion rates may rise accordingly. User terminals that have purchased the business object on this $3^{rd}$ request generally will not make a $4^{th}$ request, for they have already purchased the business object. Thus, the overall number of user terminals that make a $4^{th}$ request for Business object 1 may decrease.

Figure 6:
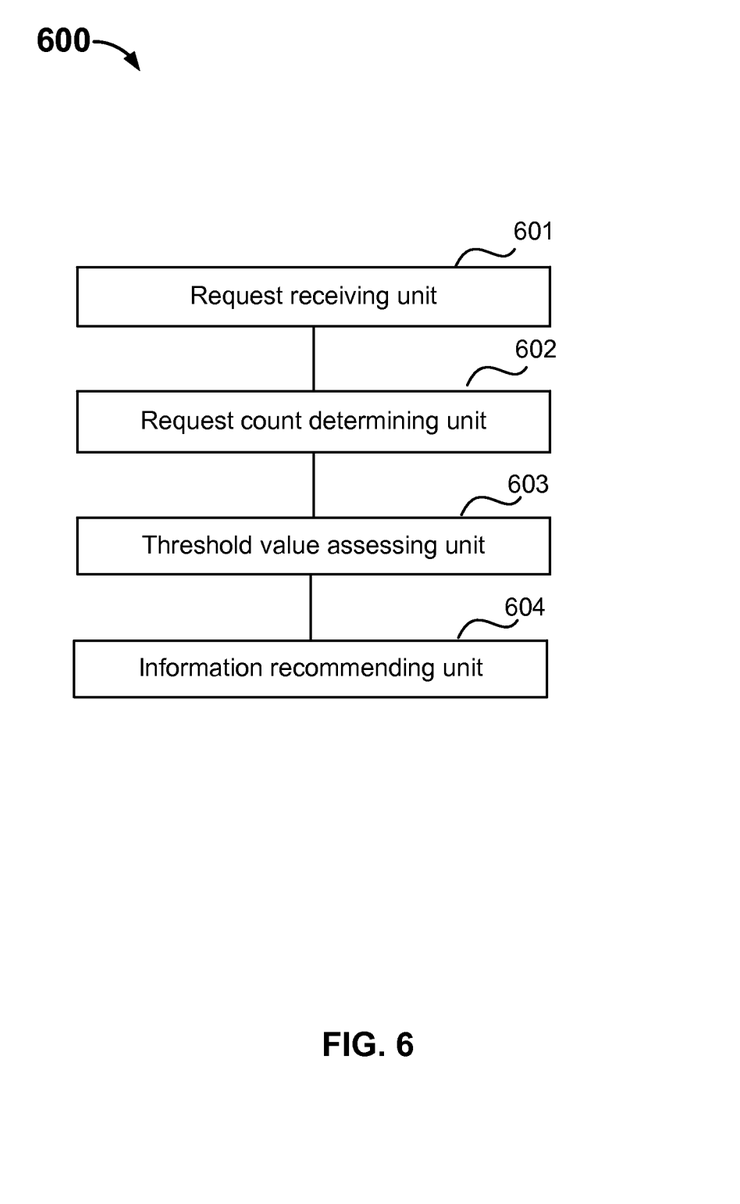
FIG. 6 is a diagram showing an embodiment of a system for sending recommendation information associated with a business object.

FIG. 6 is a diagram showing an embodiment of a system for sending recommendation information associated with a business object. In the example, system 600 includes request receiving unit 601, request count determining unit 602, threshold value assessing unit 603, and information recommending unit 604.

The units can be implemented as software components executing on one or more processors, as hardware such as programmable logic devices and/or Application Specific Integrated Circuits designed to perform certain functions, or a combination thereof. In some embodiments, the units can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The units may be implemented on a single device or distributed across multiple devices.

Request receiving unit 601 is configured to receive from a user terminal a request for data associated with a business object.

Request count determining unit 602 is configured to keep track of the number of requests, the request count, for data associated with the business object that has been received from the user terminal.

Threshold value assessing unit 603 is configured to determine whether the number determined by request count determining unit 602 has reached a request threshold value associated with the business object.

Information recommending unit 604 is configured to send to the user terminal a set of recommendation information associated with the business object in response to a determination by threshold value assessing unit 603 that the request count has reached the request threshold value.

Figure 7:
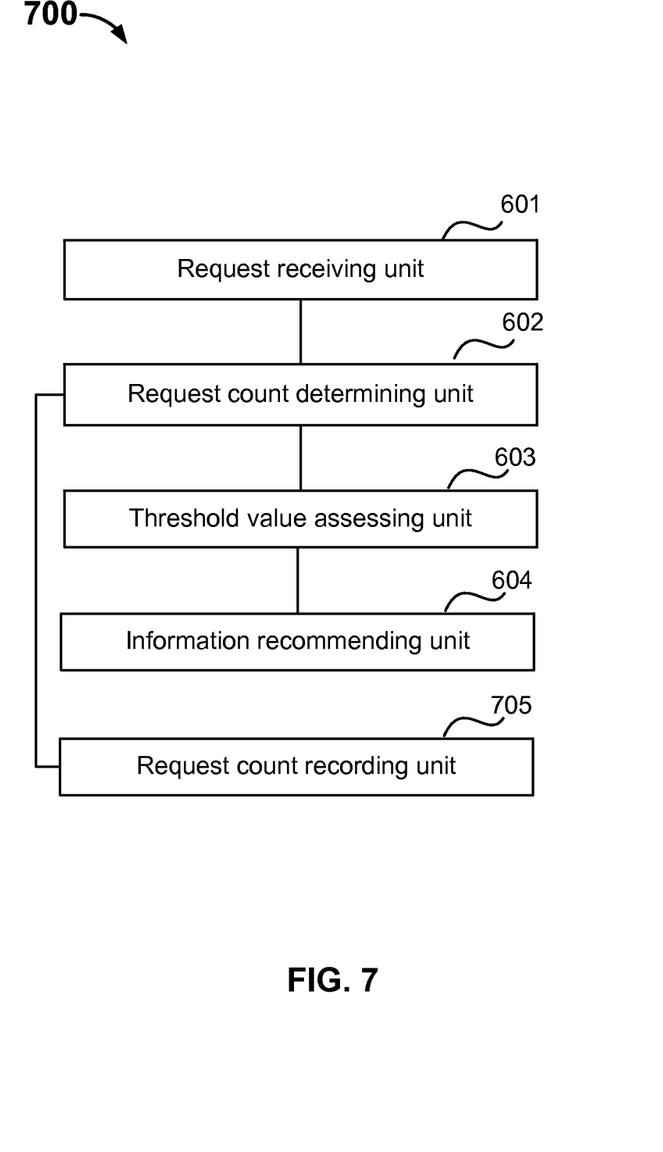
FIG. 7 is a diagram showing an embodiment of a system for sending recommendation information associated with a business object.

FIG. 7 is a diagram showing an embodiment of a system for sending recommendation information associated with a business object. In the example, system 700 is similar to system 600 but additionally includes request count recording unit 705.

Request count recording unit 705 is configured to record in a request record a count of the number of requests for data associated with a business object that have been received from each of one or more identifiers associated with respective user terminals.

In system 700, request count determining unit 602 is additionally configured to look up a request count record corresponding to each of the user terminals identified by the identifiers stored by request count recording unit 705. If a request includes a combination of a user terminal and the business object cannot be found in an entry in the request information maintained by request count recording unit 705, then a corresponding entry is created and a total request count corresponding to the entry is set to one. But if a request includes a combination of a user terminal and the business object can be found in an entry in the request information maintained by request count recording unit 705, then a total request count corresponding to the entry is incremented by one. After the entry been created or updated in the maintained request count information by request count determining unit 602, threshold value assessing unit 603 determines whether the total request count associated with the entry meets the request threshold value associated with the business object. In the event that the request threshold value is met, then information recommending unit 604 is configured to send to the user terminal associated with the entry a set of recommendation information associated with the business object associated with the entry.

Figure 8:
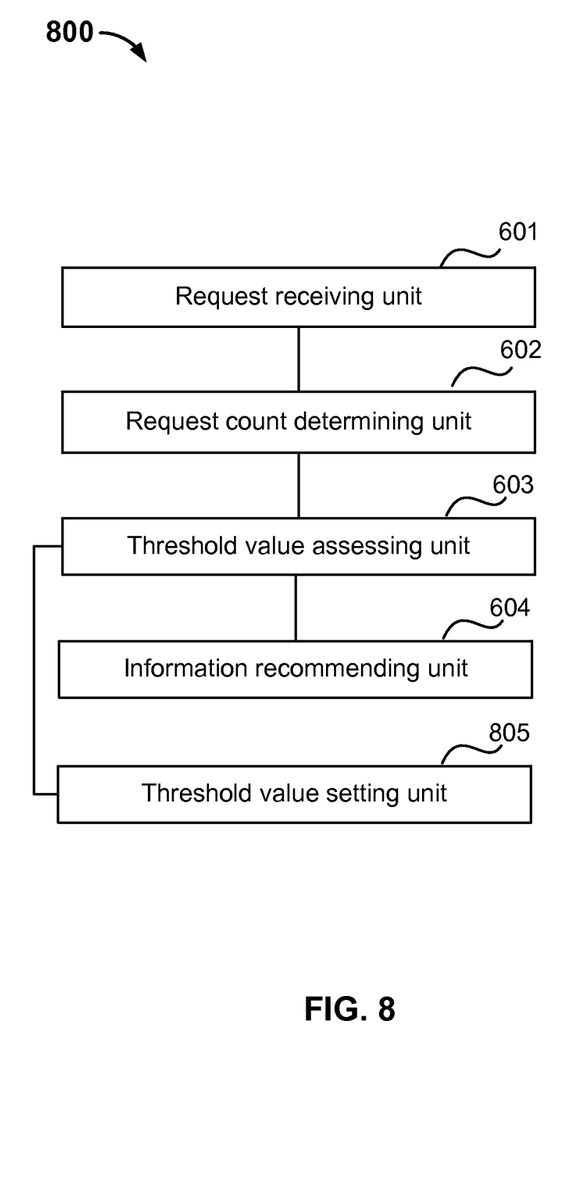
FIG. 8 is a diagram showing an embodiment of a system for sending recommendation information associated with a business object.

FIG. 8 is a diagram showing an embodiment of a system for sending recommendation information associated with a business object. In the example, system 800 is similar to system 600 but additionally includes threshold value setting unit 805.

Threshold value setting unit 805 is configured to receive a set of recommendation information associated with a business object by a seller user associated with selling the business object. In some embodiments, threshold value setting unit 805 is configured to receive a user selected value for the request threshold value associated with the business object. In some embodiments, threshold value setting unit 805 is configured to determine the request threshold value for the request threshold value based on historical request data associated with the business object. In some embodiments, threshold value setting unit 805 is configured to determine, for a business object, a transaction converation rate associated with each of at least one request count and determine a request threshold value based on a trend associated with the set of determined transaction conversation rates.

Embodiments of the information recommending techniques provided by embodiments of the present application may be realized through computer programs. Persons skilled in the art should be able to understand that the functional unit partition pattern described above is but one of a great number of unit partition patterns. An information recommending technique shall fall within the protective scope of the present application so long as it has the functions described above, even if it is partitioned into other functional units or is not partitioned into functional units.

A person skilled in the art should understand that the embodiments of the present application can be provided as methods, devices (equipment), or computer software products. Therefore, the present application can take the form of embodiments consisting entirely of hardware, embodiments consisting entirely of software, and embodiments which combine software and hardware. In addition, the present application can take the form of computer program products implemented on one or more computer-operable storage media (including but not limited to magnetic disk storage devices, CD-ROMs, and optical storage devices) containing computer operable program codes.

The present application is described with reference to flow charts and/or block diagrams based on methods, devices (equipment) and computer program products of embodiments of the present application. It should be understood that each process and/or block in the flow charts and/or block diagrams, and combinations of processes and/or blocks in the flow charts and/or block diagrams, can be achieved through computer program commands. One can provide these computer commands to a general-purpose computer, a specialized computer, an embedded processor or the processor of other programmable data processing equipment so as to give rise to a machine, with the result that the commands executed through the computer or processor of other programmable data processing equipment give rise to a device that is used to realize the functions designated by one or more processes in a flow chart and/or one or more blocks in a block diagram.

These computer program commands can also be stored on computer-readable storage devices that can guide computers or other programmable data processing equipment to work in a particular way, with the result that the commands stored on these computer-readable devices give rise to products that include command devices. These command devices realize the functions designated in one or more processes in a flow chart and/or one or more blocks in a block diagram.

These computer program commands can also be loaded onto a computer or other programmable data processing equipment, with the result that a series of operating steps are executed on a computer or other programmable equipment so as to give rise to computer processing. In this way, the commands executed on a computer or other programmable equipment provide steps for realizing the functions designated by one or more processes in a flow chart and/or one or more blocks in a block diagram.

Although preferred embodiments of the present application have already been described, a person skilled in the art can make other modifications or revisions to these embodiments once he grasps the basic creative concept. Therefore, the attached claims are to be interpreted as including the preferred embodiments as well as all modifications and revisions falling within the scope of the present application. Obviously, a person skilled in the art can modify and vary the present application without departing from the spirit and scope of the present invention. Thus, if these modifications to and variations of the present application lie within the scope of its claims and equivalent technologies, then the present application intends to cover these modifications and variations as well.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for sending recommendation information, comprising:
   one or more processors configured to:
      receive from a user terminal a request for data associated with a business object;
      determine a count of requests for the data associated with the business object from the user terminal based at least in part on the request;
      determine, based at least in part on historical request data associated with the business object, a first transaction conversion rate for a first request count and a second transaction conversion rate for a second request count, the first and second request counts being associated with the business object;
      determine a request threshold value for the business object based at least in part on the first and second transaction conversion rates; and
      determine whether the count of requests meets the request threshold value associated with the business object,
      wherein in the event that the count of requests meets the request threshold value, send the requested data and a set of recommendation information associated with the business object, over a network, to the user terminal to cause a conservation of network resources by causing a reduction in a number of subsequent repetitive searches that is received from the user terminal associated with the business object, and
      wherein the requested data comprises web page data that is configured to cause a presentation of a web page associated with the business object at the user terminal, wherein the set of recommendation information associated with the business object is configured to cause an overlay to be presented over the web page associated with the business object at the user terminal; and one or more memories coupled to the one or more processors and configured to provide the one or more processors with instructions.

2. The system of claim 1, wherein in the event that the count of requests does not meet the request threshold value, send the requested data but not the set of recommendation information associated with the business object to the user terminal.

3. The system of claim 1, wherein the one or more processors are further configured to:
  determine an identifier associated with the user terminal and an identifier associated with the business object from the request; and
  look up an entry in maintained request count information associated with a combination of the identifier associated with the user terminal and the identifier associated with the business object;
  in the event that the entry cannot be found, create the entry and set a total request count associated with the entry to one, and
  in the event that the entry is found, update the total request count associated with the entry.

4. The system of claim 1, wherein the request threshold value is based at least in part on a user configured value.

5. The system of claim 1, wherein the business object comprises a product.

6. The system of claim 1, wherein the business object comprises a set of information.

7. The system of claim 1, wherein the set of recommendation information includes one or more of the following: a lowered acquisition condition associated with the business object, a sales pitch associated with the business object, user feedback associated with the business object, and additional information associated with the business object.

8. The system of claim 1, wherein the one or more processors is further configured to:
  reset the request count associated with the user terminal at completion of a set time interval.

9. The system of claim 1, wherein the request for the data associated with the business object is stored at a local storage of a first server, wherein the one or more processors are further configured to:
  determine that a data volume associated with request count information stored at the local storage of the first server exceeds a preset data volume; and
  in response to the determination that the data volume associated with the request count information exceeds the preset data volume, store a subsequent request for the data associated with the business object in a second server, wherein the second server is different from the first server.

10. The system of claim 1, wherein the overlay is generated using an iframe.

11. A method for sending recommendation information, comprising:
  receiving, using a processor, from a user terminal a request for data associated with a business object;
  determining a count of requests for the data associated with the business object from the user terminal based at least in part on the request;
  determining, based at least in part on historical request data associated with the business object, a first transaction conversion rate for a first request count and a second transaction conversion rate for a second request count, the first and second request counts being associated with the business object;
  determining a request threshold value for the business object based at least in part on the first and second transaction conversion rates; and
  determining, using the processor, whether the count of requests meets the request threshold value associated with the business object, wherein in the event that the count of requests meets the request threshold value, sending the requested data and a set of recommendation information associated with the business object, over a network, to the user terminal to cause a conversation of network resources by causing a reduction in a number of subsequent repetitive searches that is received from the user terminal associated with the business object, and
  wherein the requested data comprises web page data that is configured to cause a presentation of a web page associated with the business object at the user terminal, wherein the set of recommendation information associated with the business object is configured to cause an overlay to be presented over the web page associated with the business object at the user terminal.

12. The method of claim 11, wherein in the event that the count of requests does not meet the request threshold value, sending the requested data but not the set of recommendation information associated with the business object to the user terminal.

13. The method of claim 11, further comprising:
  determining an identifier associated with the user terminal and an identifier associated with the business object from the request; and
  looking up an entry in maintained request count information associated with a combination of the identifier associated with the user terminal and the identifier associated with the business object;
  in the event that the entry cannot be found, creating the entry and setting a total request count associated with the entry to one, and
  in the event that the entry is found, updating the total request count associated with the entry.

14. The method of claim 11, wherein the request threshold value is based at least in part on a user configured value.

15. The method of claim 11, wherein the business object comprises a product.

16. The method of claim 11, wherein the business object comprises a set of information.

17. The method of claim 11, wherein the set of recommendation information includes one or more of the following: a lowered acquisition condition associated with the business object, a sales pitch associated with the business object, user feedback associated with the business object, and additional information associated with the business object.

18. A computer program product for sending recommendation information, the computer program product being embodied in a tangible non-transitory computer readable storage medium and comprising computer instructions for:
  receiving from a user terminal a request for data associated with a business object;
  determining a count of requests for the data associated with the business object from the user terminal based at least in part on the request;
  determining, based at least in part on historical request data associated with the business object, a first transaction conversion rate for a first request count and a second transaction conversion rate for a second request count, the first and second request counts being associated with the business object;

determining a request threshold value for the business object based at least in part on the first and second transaction conversion rates; and determining whether the count of requests meets the request threshold value associated with the business object, wherein in the event that the count of requests meets the request threshold value, sending the requested data and a set of recommendation information associated with the business object, over a network, to the user terminal to cause a conversation of network resources by causing a reduction in a number of subsequent repetitive searches that is received from the user terminal associated with the business object, and wherein the requested data comprises web page data that is configured to cause a presentation of a web page associated with the business object at the user terminal, wherein the set of recommendation information associated with the business object is configured to cause an overlay to be presented over the web page associated with the business object at the user terminal.

* * * * *